Aug. 7, 1945.  F. P. FORSS  2,381,533

MOTOR ARMATURE

Filed Dec. 30, 1943

INVENTOR.
FRITHIOF P. FORSS
BY
ATTORNEY.

Patented Aug. 7, 1945

2,381,533

UNITED STATES PATENT OFFICE 2,381,533

MOTOR ARMATURE

Frithiof P. Forss, Aurora, Ill., assignor to Independent Pneumatic Tool Company, Chicago, Ill., a corporation of Delaware Application December 30, 1943, Serial No. 516,203

5 Claims. (Cl. 171—206)

This invention relates to improvements in motor armatures for motors for portable electrically motor driven drills and like tools.

The electric motors employed in the portable tools, due to the limited space and weight and high speed requirements of such tools, are subjected to considerable vibrations and strains and relatively high motor temperatures in the operation of said tools. It is impracticable to equip these tools with the ordinary protective devices against overloads and the tools are frequently run at high temperatures.

In addition, centrifugal force due to high motor speeds and the strains from high temperatures, subject the armature windings to destructive vibrations caused by the nature of the load and by even the slightly worn bearings for the armature shaft and the gears which constitute the drive from the armature shaft to the tool spindle or equivalent element of the tool. Expansion and contraction of the armature coils also takes place due to the uneven temperatures at which the tools are run, all of which factors contribute to motor failure caused by breakage of the leads from the armature coils at or adjacent their connection to the commutator bars or segments.

The vibrations hereinabove mentioned are both torsional and longitudinal converging at the weakest part of the armature shaft on which both the armature core and the commutator are fixed and mounted in axially spaced relation to accommodate the loop-shaped end portions of the armature coils next adjacent to the commutator. In a machine wound armature which is the prevailing construction for these portable tool motors for cost reduction to render the tools available for the industries at large, the lead wires from the armature coils to the commutator bars are usually twisted together in pairs at the outer diameter or circumference of the coils and are brought down and secured by soldering to the selected commutator bars. To protect these lead wires from the effect of centrifugal force in the operation of the motors at the high speeds demanded for maximum possible power for the weight of these portable tools, it has been the practice heretofore to hold the leads down against the adjacent coil ends in the space between the commutator and armature core by a canvas or similar hood applied about the wires in this space or by a string band wrapped about the wires at the coil ends to form a hood. The armature is then usually impregnated with an insulating composition and baked with the lead wires firmly embedded in the mass. It is evident that any vibrations taking place between the commutator and the armature core are apt to focus at a definite point on the lead wires where they leave the baked insulation mass to reach the commutator bars causing crystallization and breakage of the leads at or adjacent such points with motor failure the result.

The purpose and object of my invention is to provide an armature construction which overcomes the defects above mentioned and it is within the contemplation of my invention to provide an arrangement wherein the lead wires connecting the armature coils to the commutator bars have more or less free portions in the space between the armature core and the commutator to respond to these vibrations and prevent the localization thereof at any points along the wires to cause lead wire breakage which as evident from the above has been a prime cause of motor failure in these portable electrically motor driven tools.

In keeping with the objects of my invention, I provide a cup-shaped saddle member of fiber or other insulating material in the space between the commutator and the armature core and supported by the armature shaft in enclosing relation to the adjacent coil ends and over which the lead wires from said coils to the commutator bars are laid and fastened with free and exposed portions to respond to tool vibrations and prevent focusing of the same on the lead wires to cause breakage.

A further object of my invention is to provide a washer member of fiber or other insulating material in said space between the commutator and the armature core at the front end of the saddle member and having peripheral slots to guide and support the lead wires to the selected commutator bars.

A further object of my invention is to provide said cup-shaped saddle member with slots at its outer end adjacent to the armature core for the outward passage of the lead wires from the enclosed coil ends to the outer side of the saddle member for extension to the commutator bars for connection therewith.

A further object of my invention is to bind the leads to the outside of the saddle member adjacent the slots in the washer member and to bind the saddle member firmly to the enclosed coil ends at the slots in the saddle member through which the leads extend to prevent centrifugal force having a destructive effect on the leads.

The invention consists further in the structural features and combination of parts hereinafter described and claimed.

In the accompanying drawing—

Figure 1:
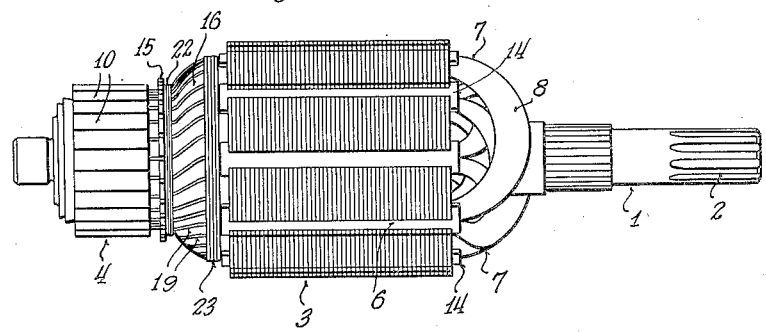
Fig. 1 is a side view of a motor armature constructed in accordance with my invention.

As shown in the drawing, the motor armature of my invention comprises an armature shaft 1, which when the motor is located within a portable tool, has its opposite ends journalled in ball or roller bearings in the tool housing as in these tool structures. The front end of the armature shaft 1 is provided with gear teeth 2 for driving the speed reducing gearing supported within the tool case between the armature shaft and the tool spindle (not shown) at the front end of the tool.

Fixed on the shaft 1 for rotation therewith is the armature core 3 and the commutator 4, respectively. The core 3 is comprised of a laminated structure made up of the usual metallic, disc-like, circular plates or stampings 5, 5 secured in assembled relation on the shaft in a manner common to this art. Said plates 5 are provided with openings which when the plates are assembled on the shaft 1 provide longitudinally extending slots 6, 6 to receive the coils 7, 7 for the armature. The loop-shaped end portions 8, 8 of the coils 7 extend beyond the opposite ends of the core 3 as customary in these armature constructions. The coil ends 8 are insulated from the armature plates 5 by interposed insulating discs, one of which is shown at 9 in Fig. 2. These discs 9 have openings to register with the core slots 6 to pass the coils 7.

The commutator 4 is comprised of the requisite number of bars or segments 10, 10 insulated from each other and from the holder 11 and its clamping member 12 which mount the bars 10 on the shaft 1. The commutator 4 is secured to the shaft 1 in axially spaced relation to the core 3 to accommodate the adjacent ends 8 of the coils 7 therebetween as shown in Fig. 2.

The armature is machine wound, that is, the coils 7 are wound in the selected core slots 6 by a suitable machine with insulating coverings 13 thereabout, after which insulating strips 14, 14 are inserted endwise, one in each slot 6, to close the outer portions thereof in keeping with the usual practice.

Figure 2:
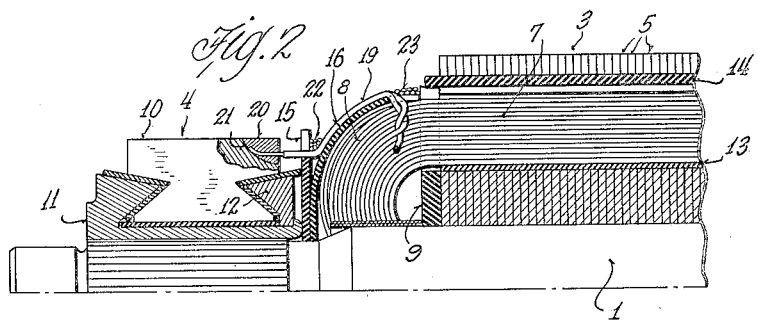
Fig. 2 is a fragmentary, longitudinal half section of the armature and its shaft.
Figure 3:
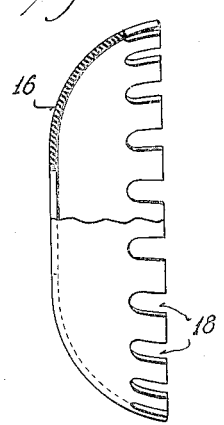
Fig. 3 is a side view of the saddle member of my invention shown partly in section.
Figure 4:
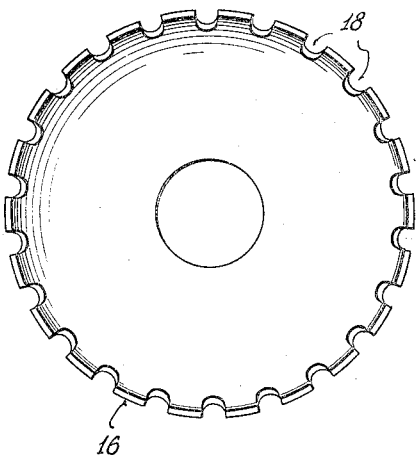
Fig. 4 is a face view of the saddle member looking into the same.
Figure 5:
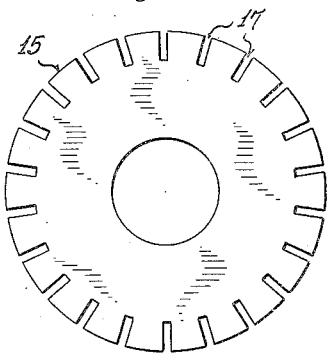
Fig. 5 is a face view of the washer member to be hereinafter described.

In accordance with my invention, a disc-like washer 15 and a cup-shaped saddle member 16, each formed of a self-sustaining, fiber or other insulating material are applied about the shaft 1 in the space between the core 3 and the commutator 4 as shown in Fig. 2. This insertion is made in assembling the armature, and the washer member 15 is located next adjacent to the inner side of the commutator 4. The saddle member 16 is located between the washer member 15 and the adjacent end of the assembled core plates 5. The saddle member 16 extends across the space between the washer 15 and the opposed end of the core 3 and by its cup-shaped form encloses the loop-shaped ends 8 of the coils in such space as shown in Fig. 2. The saddle member 16 is supported by the shaft 1 and extends relatively close to the insulating disc 9 at the plates 5. The body of the saddle member 16 is centrally apertured to pass the shaft 1 and the washer 15 is similarly formed for a like purpose as shown in Figs. 3, 4 and 5.

The washer member 15 is substantially equal to the diameter of the commutator 4 and is provided at its outer edge with peripheral slots 17 equal in number to the commutator bars 10, there being a slot opposite each bar. The outer end of the saddle member 16 is similarly slotted at 18, which slots 18 give the saddle member a castellated construction at its end next adjacent the core 3 as shown herein.

The leads 19, 19 from the ends of the coils 7 at the commutator 4 are extended to the outerside of the saddle member 16 through its slots 18 and are brought down on the outerside of the saddle member to the selected commutator bars 10 through the slots 17 in the washer member 15. The leads are soldered at 20 to the commutator bars 10 in narrow recesses 21 therein as detailed in Fig. 2.

A thread band 22 is wound and secured about the leads 19 just inside the washer member 15 to hold the leads within the slots 17 of the washer member. The leads 19 where they leave the coils are paired and twisted together with the result that small, more or less loose loops are likely to be formed due to centrifugal force in the rotation of the motor. It is desirable that this area of the saddle member 16 be firmly held together to prevent this movement. In keeping with this purpose, the slotted upper portion of the cup 16 is formed substantially parallel to the cup axis for a thread band 23 to bind the parts firmly together, the slotted construction of the cup providing the necessary flexibility for the band 23 to press the castellated part of the cup against the enclosed coil ends as shown.

It will be seen from the construction and arrangement of my invention that the leads 19 lay free and exposed on the outer surface of the cup or saddle member 16 between the slotted ends of the cup 16 and the washer 15, respectively. The wires or leads 19 also extend across the space between the washer 15 and the commutator bars or segments 10. The effect of this is that torsional or other vibrations do not focus on the points where the leads are secured to the commutator bars and crystallization of the copper to break the wires at these points does not occur. Instead, the vibrations are harmlessly expanded along the free portions of the leads.

In place of the thread band 23, a band of fiber paper or similar material could be placed on top of the cup with a wire band around it. The purpose of this would be to aid in balancing the armature by adding solder to the wire band at the desired circumferential location.

The construction shown and described is simple and overcomes the defects hereinbefore mentioned with respect to lead wire breakage in armatures for motors for portable motor driven tools. The invention has the advantages herein defined in relatively small motors in machines subjected to vibrations in use.

The details of construction and arrangement of parts shown and described may be variously changed and modified without departing from the spirit and scope of my invention, except as pointed out in the annexed claims.

I claim as my invention:

1. A motor armature of the character described comprising, a shaft, a core and a commutator fixed on the said shaft in axially spaced relation, coils wound on the core in slots therein and having their loop-shaped end portions beyond the opposite ends of the core, the loop-shaped end portions of the coils at the commutator occupying the space between the commutator and the core, leads from the last mentioned loop-shaped end portions of the coils extending across said space to the commutator and secured to the selected bars or segments thereof, and means supported in the space between the commutator and the core in enclosing relation to the loop-shaped end portions of the coils in said space and supporting the leads with their intermediate portions free to yield to the vibrations incident to armature operation.

2. A motor armature of the character described comprising, a shaft, a core and a commutator fixed on said shaft in axially spaced relation, coils wound on the core in slots therein and having their loop-shaped end portions beyond the opposite ends of the core, the loop-shaped end portions of the coils at the commutator occupying the space between the commutator and the core, leads from the last mentioned loop-shaped end portions of the coils extending across said space to the commutator and secured to the selected bars or segments thereof, and means supported in the space between the commutator and the core in enclosing relation to the loop-shaped end portions of the coils in said space and supporting on the outside thereof the leads in free and exposed relation to yield to vibrations incident to armature operation.

3. A motor armature of the character described comprising, a shaft, a core and a commutator fixed on said shaft in axially spaced relation, armature coils wound on the core in slots therein with the loop-shaped end portions of the coils beyond the opposite ends of the core, the loop-shaped end portions of the coils at the armature occupying the space between the commutator and the core, leads at the last mentioned loop-shaped end portions of the coils extending across said space to the commutator and secured to the selected bars or segments thereof, a cup-shaped saddle member of an insulating material on the shaft within the space between the commutator and the core and enclosing the loop-shaped end portions of the coils in said space, said saddle member having openings in its portion adjacent the core for the leads to pass from the coils to the outside of the saddle member, and means about the saddle member for fastening the leads thereto with the intermediate portions of the leads laying on the saddle member free to yield to vibrations incident to armature operation.

4. A motor armature of the character described comprising, a shaft, a core and a commutator fixed on said shaft in axially spaced relation, armature coils wound on the core in slots therein with the loop-shaped end portions of the coils beyond the opposite ends of the core, the loop-shaped end portions of the coils at the armature occupying the space between the commutator and the core, leads at the last mentioned loop-shaped end portions of the coils extending across the said space to the commutator and secured to the selected bars or segments thereof, cup-shaped saddle and washer members of insulating material supported by the shaft within the space between the commutator and the core, said washer member being next adjacent the commutator, said saddle member enclosing the loop-shaped end portions of the coils in said space, said saddle and washer members having slots therein to respectively pass the leads from the coils to the outside of the saddle member and to guide the leads to the selected commutator bars, and band means about the saddle member at the slots therein and adjacent to the washer member for holding the leads in the slots in the latter and against the saddle member between said band means.

5. A motor armature of the character described comprising, a shaft, a core and a commutator fixed on said shaft in axially spaced relation, armature coils wound on the core in slots therein with the loop-shaped end portions of the coils beyond the opposite ends of the core, the loop-shaped end portions of the coils at the commutator end occupying the space between the commutator and the core, leads at the last mentioned loop-shaped end portions of the coils extending across said space to the commutator and secured to the selected bars or segments thereof, cup-shaped saddle and washer members of insulating material supported by the shaft within the space between the commutator and the core, said washer member being next adjacent the commutator, said saddle member enclosing the loop-shaped end portions of the coils in said space, said saddle and washer member having slots therein to respectively pass the leads from the coils to the outside of the saddle member and to guide the leads to the selected commutator bars, and band means both about the saddle member, one adjacent the washer member for holding the leads in the slots therein and against the saddle from the slots in the latter, and said other band means for holding the saddle member against the loop-shaped end portions of the coils enclosed thereby.

FRITHIOF P. FORSS.